US012627934B2

(12) United States Patent
Shan et al.

(10) Patent No.: US 12,627,934 B2
(45) Date of Patent: May 12, 2026

(54) DIAMOND CANTILEVER-BASED OPTICAL MICROPHONES AND RELATED SYSTEMS AND METHODS

(71) Applicant: ZHENGZHOU UNIVERSITY, Zhengzhou City (CN)

(72) Inventors: Chongxin Shan, Zhengzhou City (CN); Shen Tian, Zhengzhou City (CN); Lei Li, Zhengzhou City (CN); Chaonan Lin, Zhengzhou City (CN); Yingying Qiao, Zhengzhou City (CN); Mingqi Jiao, Zhengzhou City (CN); Mingyang Feng, Zhengzhou City (CN); Mu Liang, Zhengzhou City (CN)

(73) Assignee: ZHENGZHOU UNIVERSITY, Zhengzhou City (CN)

( * ) Notice: Subject to any disclaimer, the term of this patent is extended or adjusted under 35 U.S.C. 154(b) by 223 days.

(21) Appl. No.: 18/597,991

(22) Filed: Mar. 7, 2024

(65) Prior Publication Data

US 2025/0106568 A1 Mar. 27, 2025

(30) Foreign Application Priority Data

Sep. 22, 2023 (CN) ......................... 202311235196.8

(51) Int. Cl.
*H04R 23/00* (2006.01)
*H04R 7/04* (2006.01)
(Continued)

(52) U.S. Cl.
CPC ............. *H04R 23/008* (2013.01); *H04R 7/04* (2013.01); *H04R 7/22* (2013.01); *H04R 31/003* (2013.01); *H04R 2307/023* (2013.01)

(58) Field of Classification Search
CPC .................................. G11B 9/14; G11B 11/26
(Continued)

(56) References Cited

U.S. PATENT DOCUMENTS 5,110,579 A * 5/1992 Anthony ................. C23C 16/27 501/86
5,365,789 A * 11/1994 Totterdell .............. G01L 9/0079 73/705
(Continued)

FOREIGN PATENT DOCUMENTS

CN 110441242 A * 11/2019 ......... G01N 21/1702

OTHER PUBLICATIONS

Fiber-optic Fabry-Perot interferometer based high sensitive cantilever microphone [online]. Sensors and Actuators A: Physical, 2018 [Available at sciencedirect.com on Jun. 5, 2018] [Retrieved Dec. 2, 2025]. Retrieved from <URL:https://www.sciencedirect.com/ science/ article/pii/S0924424717318988> (Year: 2018).*
(Continued)

*Primary Examiner* — Fan S Tsang
*Assistant Examiner* — Sean M Rinehart
(74) *Attorney, Agent, or Firm* — Addison D. Ault; IPGentleman Intellectual Property Services, LLC

(57) ABSTRACT

This invention unveils an optical microphone utilizing diamond cantilevers and its associated acoustic sensing system. The core component is a diamond cantilever, featuring a diamond diaphragm with a centrally located U-shaped groove. The manufacturing process involves several key steps: initially preparing the diamond diaphragm using silicon in a chemical vapor deposition setup, where methane and hydrogen are reacted under specific temperature and pressure conditions to form a diamond polycrystalline film on the silicon. This film is then separated from the substrate to create the diaphragm. Subsequently, a U-shaped groove is crafted on the diaphragm by applying a dry etching template and etching, resulting in the formation of the diamond cantilever, with a thickness ranging from 10 to 100 μm. This
(Continued)

method establishes a novel approach to creating sensitive and durable optical microphones.

8 Claims, 9 Drawing Sheets

(51) Int. Cl.
*H04R 7/22* (2006.01)
*H04R 31/00* (2006.01)

(58) Field of Classification Search
USPC .......................................................... 381/172
See application file for complete search history.

(56) References Cited

U.S. PATENT DOCUMENTS

| | | | | |
|---|---|---|---|---|
| 7,738,116 | B2 * | 6/2010 | Kauppinen | G01N 21/1702<br>356/498 |
| 2020/0199780 | A1 * | 6/2020 | Quack | G04B 13/02 |
| 2022/0178816 | A1 * | 6/2022 | Ma | G01N 21/8507 |

OTHER PUBLICATIONS

Effects of Design Parameters on Sensitivity of Microcantilever Biosensors [online], The 2010 IEEE/ICME International Conference on Complex Medical Engineering, 2010 [Available on ieee.org on Aug. 26, 2010] [Retrieved Dec. 3, 2025]. Retrieved from <https://ieeexplore.ieee.org/document/5558847> (Year: 2010).*

C. Vázquez, P. Baquero, and F. Hernández-Gil, "Fabry-Perot method for the characterization of integrated optical directional couplers," Appl. Opt. 34, 6874-6884, 1995 [Retrieved Dec. 3, 2025]. Retrieved from <https://opg.optica.org/ao/fulltext.cfm?uri=ao-34-30-6874> (Year: 1995).*

Machine Translation of Original publication, "CN-110441242-A", Nov. 12, 2019, worldwide.espacenet.com, pp. 1-42. (Year: 2019).*

"Mode Coupling in a Fabry-Perot Open Resonator" [online], IEEE Transactions on Microwave Theory and Techniques, 2022. [Available on ieee.org on May 27, 2021] [Retrieved Feb. 11, 2026]. Retrieved from <https://ieeexplore.ieee.org/abstract/document/9443037> (Year: 2021).*

* cited by examiner

DIAMOND CANTILEVER-BASED OPTICAL MICROPHONES AND RELATED SYSTEMS AND METHODS

TECHNICAL FIELD

The present invention pertains to the field of acoustical signal sensing technology, specifically involving an optical microphone and acoustic sensing system based on diamond cantilevers.

BACKGROUND

A microphone is an acoustic sensor that converts sound wave signals into electrical signals and is widely applied in industrial equipment fault diagnosis, material defect identification, ultrasonic medical applications, and other fields. Traditional electronic microphones, which are based on energy conversion principles, are mainly categorized as capacitive, piezoelectric, or microelectromechanical system (MEMS) types. Traditional electronic microphones commonly face challenges such as insufficient sensitivity, susceptibility to electromagnetic interference, and difficulty adapting to high-temperature, high-humidity, or corrosive environments.

Currently, a novel optical microphone based on Fabry-Perot (F-P) interference has emerged. It consists of a ceramic end face at the fiber optic end and a rigid diaphragm employing an "acoustic signal-optical signal-electrical signal" energy conversion mechanism. Incident light enters through the optical fiber, where it undergoes multiple reflections between the end face of the optical fiber and the inner side of the rigid diaphragm, thereby leading to F-P interference. The acoustic signal acts on the diaphragm, causing elastic deformation of the diaphragm surface. This deformation leads to a phase change in the inner interference light, thus converting the acoustic signal into an optical signal. The interference light can be received by a highly sensitive photoelectric detector, and after optical signal collection, it is converted into a voltage signal output. F-P microphones exhibit advantages such as compact structure, high signal-to-noise ratio (SNR), and resistance to electromagnetic interference.

In the current design of F-P microphones, the rigid diaphragm is a critical factor in microphone performance, but it commonly suffers from performance limitations. Typically, metal materials are used as rigid diaphragms. However, when the material thickness is reduced to the micron or nanometer scale to achieve high sensitivity, the mechanical strength of metal materials decreases, and residual stresses may occur, limiting sensitivity. Metal material thin films have low resonance frequencies, restricting the bandwidth of the frequency response, which is unfavorable for sound wave signal conversion. Prolonged exposure to acoustic vibrations may also lead to metal fatigue. Additionally, metal materials exhibit poor chemical stability, increasing susceptibility to corrosion from acidic gases, such as HF, $SO_2$, and $SF_6$, in industrial environments.

SUMMARY

In view of the above, some embodiments disclose an optical microphone based on diamond cantilevers, comprising a diamond cantilever component. The diamond cantilever component included a diamond diaphragm, with a U-shaped groove positioned at the middle of the diaphragm, forming the diamond cantilever within the U-shaped groove.

The preparation method for the diamond cantilever component includes the following steps:

S1, preparing a diamond diaphragm by setting silicon as a substrate in a chemical vapor deposition device; adjusting the heating temperature and pressure of the chemical vapor deposition device; introducing methane and hydrogen for the chemical vapor deposition reaction; obtaining a diamond polycrystalline thin film on the silicon substrate; and separating the diamond polycrystalline thin film from the silicon substrate to obtain the diamond diaphragm.

S2: The diamond cantilever was prepared by covering the obtained diamond diaphragm with a dry etching template with a U-shaped groove; the diamond diaphragm was etched to form a U-shaped groove on the diamond diaphragm, yielding a diamond cantilever with a thickness of 10 to 100 μm.

Some embodiments of the optical microphone based on diamond cantilevers also include a base with a first cavity at the middle position, a support base above the base for supporting the diamond diaphragm, and a clamping plate above the support base for fixing the diamond diaphragm. An optical fiber and ceramic insert in the first cavity form an F-P interference cavity with the diamond cantilever.

The sidewall of the base in some embodiments of the optical microphone based on diamond cantilevers has through-holes for external communication with the first cavity.

The diameters of the first cavity, second cavity, and third cavity in some embodiments of the optical microphone based on diamond cantilevers are the same.

The resonance frequency $\omega 0$ of the diamond cantilever in some embodiments of the optical microphone based on diamond cantilevers is expressed as:

$$\omega_0 = \frac{1.875^2}{L^2}\sqrt{\frac{EI}{\rho S(1-\sigma^2)}} = \frac{1.875^2 h}{L^2}\sqrt{\frac{E}{12\rho}}$$

where L denotes the length of the diamond cantilever, h denotes the thickness of the diamond cantilever, S denotes the cross-sectional area of the diamond cantilever, I denotes the moment of inertia of the diamond cantilever, E denotes the Young's modulus of the diamond cantilever, σ denotes the Poisson's ratio, and ρ is the density of the diamond cantilever.

The mechanical sensitivity Sm of the diamond cantilever in some embodiments of the optical microphone based on diamond cantilevers is expressed as:

$$S_m = \frac{3L^2(1-\sigma)}{Eh^2}$$

The interference sensitivity Si of the F-P interference cavity in some embodiments of the optical microphone based on diamond cantilevers is expressed as:

$$S_i = \frac{8\pi\sqrt{\xi R_1 R_2}}{\lambda} I_i \sin\frac{4\pi d}{\lambda}$$

where R1 is the reflectance of the optical fiber and ceramic insert, R2 is the reflectance of the diamond cantilever, λ is the wavelength of incident light, ξ is the optical coupling coefficient, Ii is the incident light intensity, and d is the static cavity length of the F-P interference cavity. The optical coupling coefficient is calculated as follows:

$$\xi = \frac{4\left[1 + \left(\frac{2\lambda d}{\pi n_0 \omega}\right)^2\right]}{\left[2 + \left(\frac{2\lambda d}{\pi n_0 \omega^2}\right)^2\right]^2}$$

where n0 is the refractive index of air (n0=1) and ω is the mode field radius of the optical fiber and ceramic insert.

In some embodiments of optical microphones based on diamond cantilevers, when the cavity length of the F-P interference cavity satisfies d=(2n+1)λ/8 the interference sensitivity of the F-P interference cavity is maximized, where n is a natural number.

The diamond cantilever in some embodiments of optical microphones based on diamond cantilevers is rectangular.

Some embodiments disclose an optical acoustic sensing system based on diamond cantilevers, including the optical microphone. The disclosed optical microphone based on diamond cantilevers exhibits excellent mechanical sensitivity and is prone to deformation under acoustic waves. The high Young's modulus and low density of diamond endow the diamond cantilever with a high resonance frequency, offering a wide bandwidth for acoustic devices. Compared to existing metal materials, diamond allows the fabrication of thinner, longer, and more mechanically sensitive cantilevers under the same bandwidth requirements. Additionally, the smooth surface and high optical reflectance of the diamond cantilever contributed to its excellent interference sensitivity. A high quality factor of the diamond cantilever results in low thermal noise during the energy conversion process, leading to a high SNR. The exceptional hardness of diamond suppresses sagging of the diamond cantilever due to gravity, reducing spurious signals in optical interference. The disclosed optical microphone based on diamond cantilevers is suitable for detecting weak acoustic signals and can be used in industrial environments with strong acidity and electromagnetic interference. The simple structure and low manufacturing cost of the disclosed optical microphone system based on diamond cantilevers, coupled with its resistance to electromagnetic interference and long detection range, present promising applications in the field of acoustic wave detection.

FIGURE ANNOTATIONS

Figure 1:
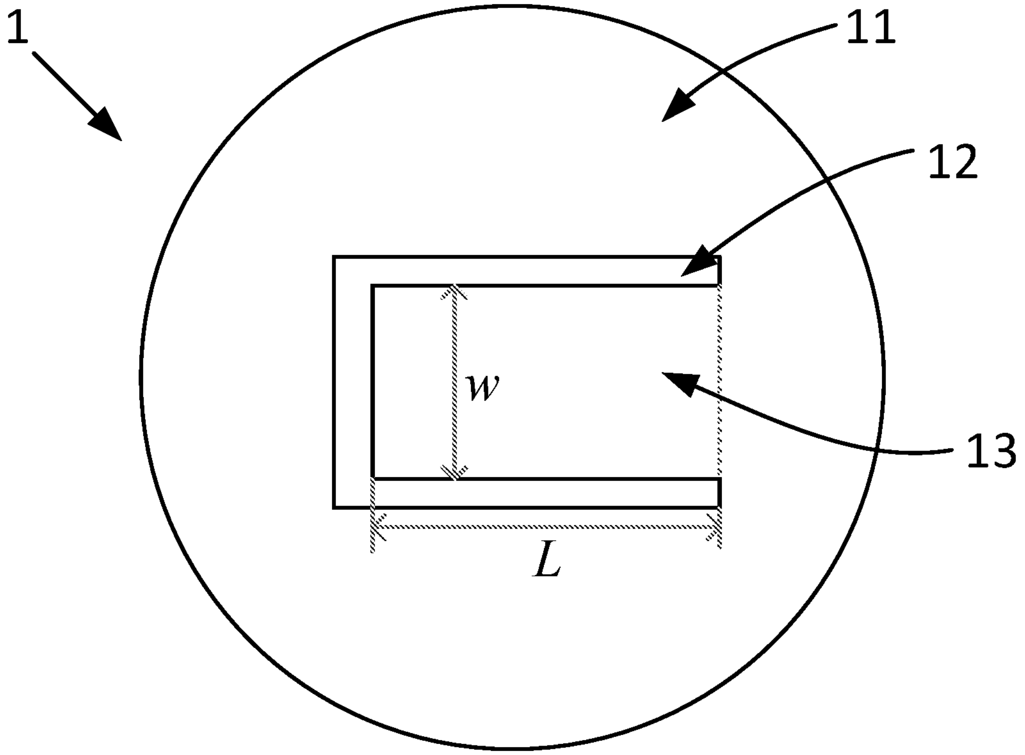
FIG. 1: Schematic diagram of the structure of the diamond cantilever component in Example 1.

1 Diamond cantilever component
2 Base
3 Gasket
4 Support base
5 Clamping plate
6 Optical fiber and ceramic insert
7 Screw
11 Diamond diaphragm
12 U-shaped groove
13 Diamond cantilever
21 First cavity
22 Through-hole
41 Second cavity
51 Third cavity

DETAILED DESCRIPTION OF THE EMBODIMENTS

In some embodiments, an optical microphone based on a diamond cantilever includes a diamond cantilever component. The diamond cantilever component comprises a diamond diaphragm, and the middle position of the diamond diaphragm is provided with a U-shaped groove. The diamond diaphragm inside the U-shaped groove formed the diamond cantilever.

A diamond diaphragm is typically a vibrating membrane component with a suitable thickness and dimensions capable of producing vibrations perpendicular to its surface under the action of sound waves. A diamond diaphragm usually has a symmetrical structure, such as rectangular, square, polygonal, or circular. Generally, the diameter of a diamond diaphragm is in the millimeter range, the thickness is in the micrometer range, and the width of a U-shaped groove is in the micrometer range. In some embodiments, the length of the diamond cantilever is 3 mm, and the width is 1 mm.

Usually, the diamond cantilever is in the central region of the diamond diaphragm. One end of the diamond cantilever is fixed to the diamond diaphragm body, serving as the fixed end of the diamond cantilever. The other end of the diamond cantilever is set as the free end and is capable of freely swinging relative to the diamond diaphragm body. Typically, a diamond cantilever is a component with a suitable thickness, shape, and size that can undergo deformation under the action of sound waves, generating oscillations during deformation. The edge portion of the diamond diaphragm usually needs to be fixed during use. Placing the diamond cantilever in the central region of the diaphragm effectively prevents the oscillation of the cantilever from being hindered by the surrounding environment, thus affecting the detection results.

A diamond cantilever usually has a symmetrical structure, facilitating the generation of regular deformations under the action of sound waves, thereby producing regular oscillations, and improving the response stability to acoustic signals. Examples of symmetrical shapes include rectangular, square, circular, and elliptical shapes.

Typically, the diamond diaphragm is fixed around the support base, and the diamond cantilever is placed in a free state. External sound fields are applied to the diamond cantilever, which is in the central region of the diaphragm, causing continuous deformation of the cantilever under the action of acoustic waves. The diamond cantilever produces oscillations perpendicular to the surface of the diamond diaphragm, converting sound wave signals into mechanical vibration signals and achieving the conversion of sound wave energy to mechanical vibration energy.

The preparation method for the diamond cantilever component includes the following steps:

S1. Preparation of the Diamond Diaphragm:

Silicon was used as a substrate and placed in a chemical vapor deposition (CVD) device. Typically, a microwave plasma CVD device is used.

The diamond polycrystal was prepared by the high-temperature high-pressure method.

Before the reaction, the silicon substrate was ultrasonically cleaned with acetone, methanol, and deionized water for 10 minutes each. Afterward, the sample was dried with high-purity nitrogen to avoid impurity contamination.

The heating temperature and pressure of the CVD device were adjusted, and a certain amount of methane and hydrogen were introduced for the CVD reaction. A diamond polycrystal film is obtained on the silicon substrate.

In some embodiments, the total flow rate of methane and hydrogen is 500 sccm. The concentration of methane in the mixed gas is 3%. The heating temperature of the CVD device ranged from 700-900° C., and the reaction time ranged from 20-40 hours.

In some embodiments, the obtained diamond polycrystal film has a thickness of more than 500 μm and a size larger than 10×10 $mm^2$.

The diamond polycrystal film is separated and polished from the silicon substrate to obtain the diamond diaphragm. Laser cutting technology can be used for separation, followed by double-sided polishing to achieve a smooth surface and uniform thickness.

S2. Preparation of Diamond Cantilever:

A dry etching template with a U-shaped groove was placed on the obtained diamond diaphragm.

The diamond diaphragm covered with the dry etching template underwent etching to form a U-shaped groove on the diaphragm. The diamond diaphragm inside the U-shaped groove extends from the outer diamond diaphragm, forming the diamond cantilever. The thickness of the diamond cantilever is 10-100 μm, and the length is in the millimeter range.

In some embodiments, the heating temperature of the CVD device is 880° C., the reaction time is 22 hours, and the total flow rate of methane and hydrogen is 500 sccm, with a 3% concentration of methane in the mixed gas. The thickness of the prepared diamond cantilever was 30 μm.

In some embodiments, the heating temperature of the CVD device is 880° C., the reaction time is 35 hours, and the total flow rate of methane and hydrogen is 500 sccm, with a 3% concentration of methane in the mixed gas. The thickness of the prepared diamond cantilever was 50 μm.

The preparation method uses chemical vapor deposition to prepare the diamond diaphragm. A diamond cantilever is obtained in the central region of the diamond diaphragm using dry etching, forming an integrated structure between the diamond cantilever and the diamond diaphragm body. This structure ensures good stability and high sensitivity.

Typically, a coupling reaction ion beam etching device is used with oxygen and argon as process gases and aluminum foil as a dry etching template to perform dry etching on the diamond diaphragm.

Diamonds have excellent properties, such as low density, high elastic modulus, high strength, chemical inertness, and biocompatibility. The high fracture toughness and high Young's modulus of diamond enable the cantilever to have a high spring constant, typically approximately 10 times greater than that of silicon cantilevers of the same size. The high Young's modulus and low density of diamond enable the cantilever to have a high resonance frequency and wide frequency response bandwidth, typically approximately 2.2 times that of silicon cantilevers of the same size. Diamond cantilevers have high mechanical sensitivity, good corrosion resistance, strong reliability, and strong resistance to electromagnetic interference and can be applied in complex industrial environments.

In some embodiments, the optical microphone based on the diamond cantilever further includes the following:

A base with the first cavity at its center.

A support base was positioned above the base to support the diamond diaphragm. The support base has a second cavity at its center, and the first cavity is connected to the second cavity. When the diamond cantilever is adaptively positioned on the support base, it corresponds to the second cavity. Typically, the diamond cantilever and the upper surface of the optical fiber and ceramic core are parallel.

A pressure plate was set above the support base to fix the diamond diaphragm in cooperation with the support base. The pressure plate has a third cavity at its center, corresponding to the second cavity. When the optical microphone is working, external sound waves act on the diamond cantilever through the third cavity, causing the diamond cantilever to vibrate between the second and third cavities.

The optical fiber and ceramic core were adapted to the first cavity. The upper surface of the optical fiber and ceramic core and the diamond cantilever form an F-P interference cavity. The upper surface of the optical fiber and ceramic core is parallel to the diamond cantilever. In the F-P interference cavity, a light beam parallel to the resonance cavity axis, after reflecting off the parallel diamond cantilever and the upper surface of the optical fiber and ceramic core, propagates parallel to the axis, never escaping the cavity. Typically, the optical fiber is made of glass, and the ceramic core is made of ceramic material.

As an optional embodiment, the optical microphone based on the diamond cantilever further includes a washer. The washer has a shape that matches the base and is used to fix the support base in cooperation with the base. By adjusting the washer, the parallelism between the support base and the upper surface of the optical fiber and ceramic core can be adjusted. Generally, a washer is made of paper, circular rubber, or copper.

As an optional embodiment, the base, support base, and pressure plate are made of polyester fiber and 3D printed, and the size parameters of the base, support base, and pressure plate can be flexibly adjusted according to on-site requirements.

In some embodiments, holes are provided on the sidewalls of the base, and the through holes connect the first cavity with the external environment of the base to ensure internal and external pressure balance and prevent internal gas from hindering the movement of the diamond cantilever.

In some embodiments, threaded holes that match each other are provided on the base, support base, and washer. Generally, the threaded holes are evenly distributed along the circumference. Screws are set in the matching threaded holes to connect and fix the base, support base, and washer. The parallelism between the support base and the upper surface of the optical fiber and ceramic core can be adjusted by setting screws and washers.

In some embodiments, the base also has a through hole for fixing the optical fiber and ceramic core.

In some embodiments, after fixing the components of the optical microphone based on the diamond cantilever with screws, an optical adhesive is used for bonding.

In some embodiments, the diameters of the first cavity, second cavity, and third cavity are the same, avoiding obstruction of incident light entering the F-P interference cavity due to different channel diameters and ensuring the vibration space of the diamond cantilever when subjected to sound pressure.

In certain embodiments, the resonant frequency ω0 of the diamond cantilever is expressed as follows:

$$\omega_0 = \frac{1.875^2}{L^2}\sqrt{\frac{EI}{pS(1-\sigma^2)}} = \frac{1.875^2 h}{L^2}\sqrt{\frac{E}{12\rho}}$$

where L is the length of the diamond cantilever, h is the thickness, S is the cross-sectional area, I is the moment of inertia, E is the Young's modulus, σ is the Poisson's ratio, and ρ is the density.

The Young's modulus E of the diamond cantilever is 1.14×1012 Pa, and the density ρ is 3515 $kg/m^3$. The resonant frequency of the diamond cantilever is 2.2 times that of a silicon cantilever of the same size.

In certain embodiments, the mechanical sensitivity Sm of the diamond cantilever is expressed as:

$$S_m = \frac{3L^2(1-\sigma)}{Eh^2}$$

It is evident from the above equation that the longer the length Lis and the thinner the thickness h of the diamond cantilever is, the stronger the mechanical sensitivity Sm of the diamond cantilever.

In certain embodiments, the interference sensitivity Si of the F-P interference cavity is expressed as:

$$S_i = \frac{8\pi\sqrt{\xi R_1 R_2}}{\lambda} I_i \sin\frac{4\pi d}{\lambda}$$

where R1 is the reflectance of the optical fiber and ceramic core. R2 is the reflectance of the diamond cantilever. λ is the wavelength of the incident light. n0 is the refractive index of air (n0=1). Ii is the intensity of the incident light. d is the static cavity length of the F-P interference cavity.

The optical coupling coefficient ξ is expressed as follows:

$$\xi = \frac{4\left[1+\left(\frac{2\lambda d}{\pi n_0 \omega}\right)^2\right]}{\left[2+\left(\frac{2\lambda d}{\pi n_0 \omega^2}\right)^2\right]^2}$$

In some embodiments, when the cavity length d of the F-P interference cavity satisfies d=(2n+1)λ/8, the interference sensitivity Si of the F-P interference cavity is maximized.

In certain embodiments, the diamond cantilever is rectangular in shape.

In certain embodiments, an optical acoustic sensing system based on a diamond cantilever includes the optical microphone. An optical microphone based on a diamond cantilever used as a sound wave sensing device responds to sound waves by converting sound wave signals into mechanical vibration signals.

In certain embodiments, the optical acoustic sensing system based on the diamond cantilever further includes a light source component for providing incident light, a detector for receiving interference light, a ring interferometer for guiding the incident light provided by the light source component into the optical microphone and directing the interference light emitted by the optical microphone into the detector, a data processing component for receiving and processing signals from the detector.

Typically, the data processing component includes a data acquisition card and a computer, where the data acquisition card receives signals from the detector and inputs them to the computer, which demodulates the voltage signal into a sound wave signal.

Generally, the light source component generates incident light, and the incident light passes through the ring interferometer to enter the optical microphone based on the diamond cantilever. The incident light reflects between the diamond cantilever and the upper surface of the optical fiber and ceramic core, forming interference light. The interference light passes through the ring interferometer into the detector, where it is converted into a voltage signal. The voltage signal is then output to the data processing component, which demodulates the voltage signal into a sound wave signal. External sound waves applied to the diamond cantilever cause continuous deformation, resulting in a phase change in the interference light and leading to a change in the voltage signal.

In certain embodiments, the light source component includes a light source, a temperature controller, and a current controller. The temperature controller and the current controller are used to control the wavelength of the light source. Typically, a distributed feedback (DFB) laser is chosen as the light source.

In conjunction with examples, the following provides further illustrative details of the technology.

EXAMPLE 1

The optical microphone based on the diamond cantilever disclosed in this example comprises a diamond cantilever component 1, as shown in FIG. 1. The diamond cantilever component 1 includes a diamond diaphragm 11, which is a circular thin film. In the middle part of diamond diaphragm 11, U-shaped groove 12 is etched along the horizontal direction. The diamond diaphragm inside the U-shaped groove 12 forms a diamond cantilever 13. The left end of the diamond cantilever 13 is a free end, and the right side is an integral structure with the diamond diaphragm. The diamond cantilever 13 is in the central region of the diamond diaphragm 11.

The width of the diamond cantilever 13 is denoted as w, the length as L, and the thickness as h. The cross-sectional area is S=wh, and the moment of inertia is I=h3w/12. The resonant frequency ω0 of the diamond cantilever 13 is expressed as Equation (1):

$$\omega_0 = \frac{1.875^2}{L^2}\sqrt{\frac{EI}{\rho S(1-\sigma^2)}} = \frac{1.875^2 h}{L^2}\sqrt{\frac{E}{12\rho}} \tag{1}$$

In Equation (1), E is Young's modulus, σ is Poisson's ratio, and ρ is the density. The Young's modulus E of the diamond cantilever is 1.14×1012 Pa, and the density ρ is 3515 kg/$m^3$. The resonant frequency of the diamond cantilever of the same size is 2.2 times that of a silicon cantilever.

When an external sound pressure is uniformly applied to the surface of the diamond cantilever, the displacement Δx generated at the free end of the diamond cantilever is expressed by Stoney's equation as Equation (2):

$$\Delta x = \frac{3L^2(1-\sigma)}{Eh^2}\Delta P \tag{2}$$

The mechanical sensitivity Sm of the diamond cantilever is related to the displacement $S_m$=Δx/ΔP. Therefore, a thinner and longer diamond cantilever undergoes easier deformation and exhibits higher sensitivity under the same sound pressure.

EXAMPLE 2

Figure 2:
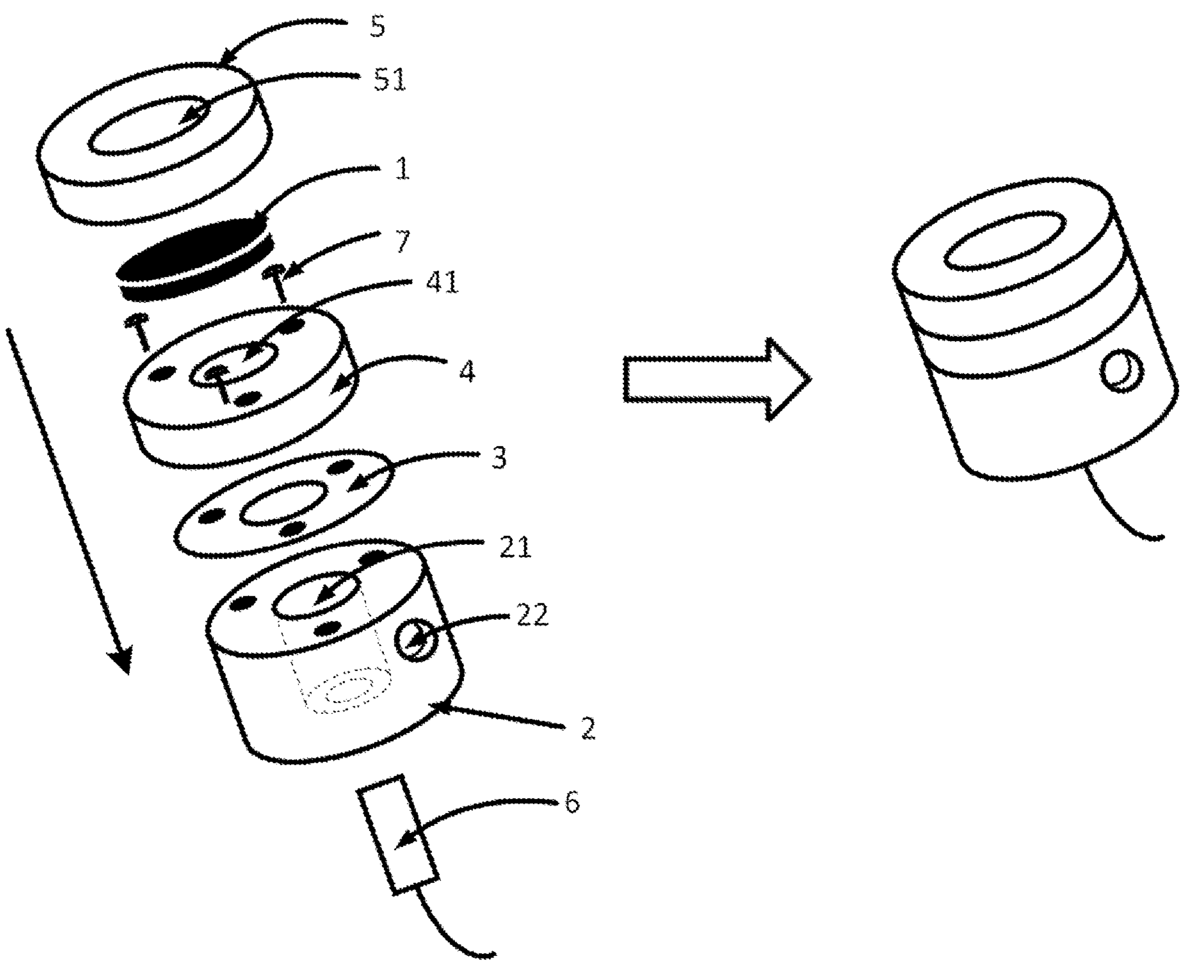
FIG. 2: Assembly schematic of the optical microphone based on diamond cantilevers in Example 2.
Figure 3:
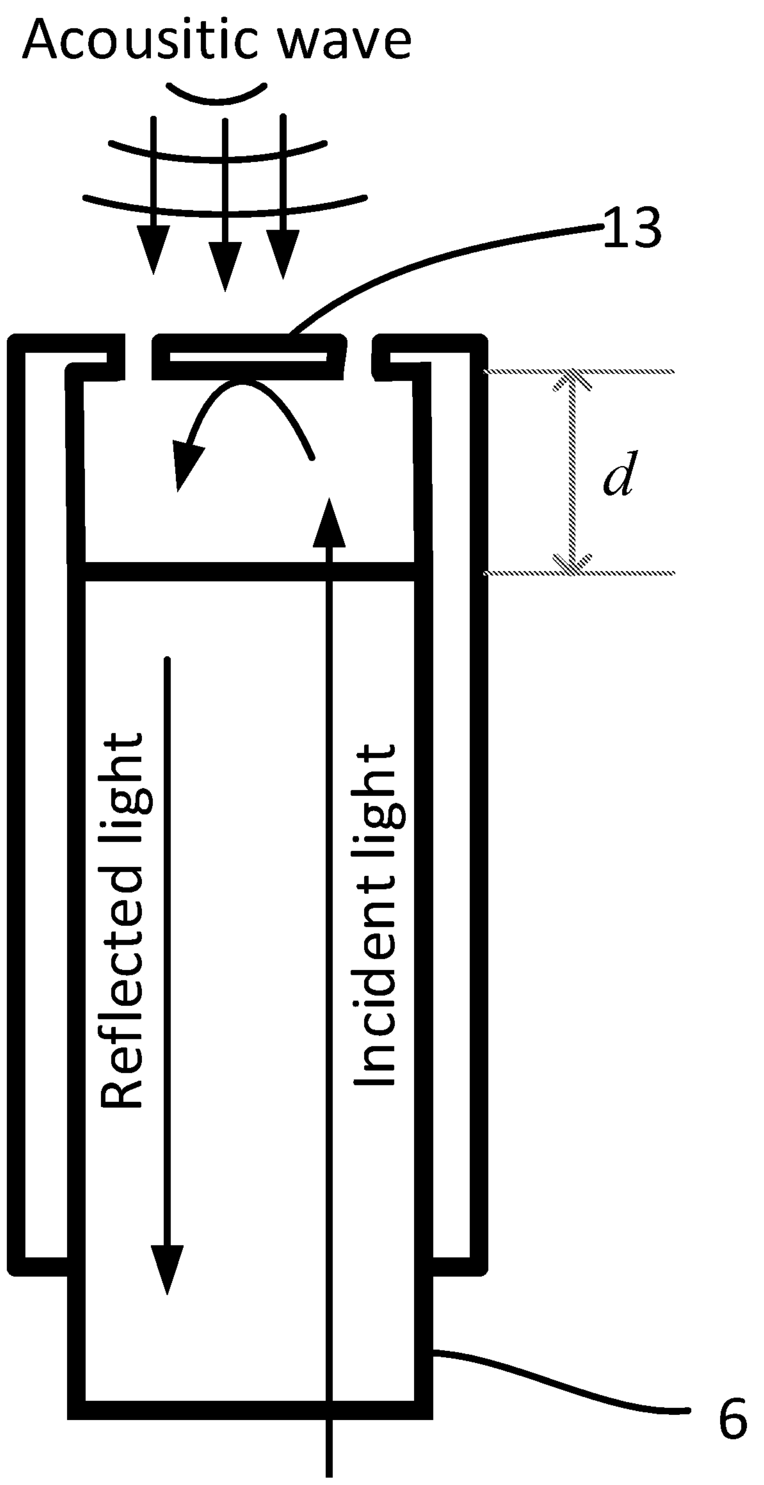
FIG. 3: Schematic illustration of the working principle of the optical microphone based on diamond cantilevers in Example 2.

FIG. 2 shows the assembly schematic of the optical microphone based on the diamond cantilever disclosed in Example 2, while FIG. 3 provides a schematic diagram of its operational principle.

As depicted in FIG. 2, the optical microphone based on the diamond cantilever comprises a circular diamond cantilever component 1, a cylindrical base 2, and a circular first cavity 21 penetrating the middle position of base 2. A through-hole 22, connected to the first cavity 21, pierces the right wall of base 2. Below base 2, optical fibers and ceramic core 6 are arranged, and they can be adapted to fit into the first cavity 21. Positioned above base 2 is circular washer 3, with an inner diameter identical to the diameter of the first cavity 21. Above washer 3 is support seat 4, featuring a cylindrical second cavity 41 pierced through its central position, with a diameter identical to that of the first cavity 21. Positioned above support seat 4 is a pressure plate 5 shaped to match support seat 4, which cooperates with support seat 4 to secure the diamond cantilever component 1. The central portion of pressure plate 5 features a third cavity 51 corresponding to the diamond cantilever.

When assembling the optical microphone, as shown in the left diagram of FIG. 2, washer 3 is positioned above base 2, support seat 4 is placed above washer 3, support seat 4 is aligned with washer 3, and screw holes are placed on the upper surface of base 2. Screw 7 was then inserted and tightened into the holes, connecting and securing support seat 4, washer 3, and base 2. This process connects the second cavity (41) to the first cavity (21). The diamond cantilever component 1 is positioned on support seat 4, and pressure plate 5 is then placed above diamond cantilever component 1. Through the cooperation of pressure plate 5 and support seat 4, diamond cantilever component 1 is fixed, with the diamond cantilever located above cylindrical second cavity 41 and below cylindrical third cavity 51. The optical fiber and ceramic core 6 are inserted into the appropriate position in the first cavity 21, allowing the upper surface of the optical fiber and ceramic core 6 to be parallel to the diamond cantilever, forming an F-P interference cavity between the upper surface of the optical fiber and ceramic core and the lower surface of the diamond cantilever.

As illustrated in FIG. 3, with the upper surface of the optical fiber and ceramic core 6 parallel to the diamond cantilever 13, there is an air medium between the upper surface of the optical fiber and ceramic core 6 and the lower surface of the diamond cantilever 13, forming an F-P interference cavity. During the operation of the optical microphone, incident light enters from below the optical fiber and ceramic core, is transmitted through the optical fiber and ceramic core, passes through the air medium, reflects off the lower surface of the diamond cantilever, travels through the air medium, and exits through the optical fiber and ceramic core as reflected light. When the reflectivity of the lower surface of the diamond cantilever is relatively low compared to the upper surface of the optical fiber and ceramic core, this can be simplified into a dual-beam interference model, where the reflected light interferes with the incident light.

When there is no external sound field, the intensity Ir of the interference light inside the optical microphone is represented by Equation (3):

$$I_r = I_i\left(R_1 + \xi R_2 - 2\sqrt{\xi R_1 R_2}\cos\delta\right) \tag{3}$$

In Equation (3), Ii is the intensity of the incident light, R1 is the reflectance of the optical fiber and ceramic core, R2 is the reflectance of the diamond cantilever, and δ is the phase difference between the incident light and reflected light. The optical coupling coefficient, ξ, which is related to the static cavity length d of the F-P interference cavity and the wavelength λ of the incident light, is expressed as Equation (4):

$$\xi = \frac{4\left[1+\left(\frac{2\lambda d}{\pi n_0 \omega}\right)^2\right]}{\left[2+\left(\frac{2\lambda d}{\pi n_0 \omega^2}\right)^2\right]^2} \tag{4}$$

In Equation (4), no is the refractive index of air (n0=1), and ω is the mode field radius of the optical fiber and ceramic core.

In this example, when stable interference occurs, the interference sensitivity Si of the F-P interference cavity is represented by Equation (5):

$$S_i = \frac{\Delta I_r}{\Delta d} = \frac{8\pi\sqrt{\xi R_1 R_2}}{\lambda} I_i \sin\frac{4\pi d}{\lambda} \tag{5}$$

In Equation (5), when the wavelength of the incident light satisfies d=(2n+1)λ/8, the interference sensitivity of the F-P interference cavity is maximized, where n is a natural number.

From the expression of the interference sensitivity Si, it is evident that under the same optical transducer structure, the reflectivity of the cantilever is the main factor affecting the optical sensitivity. The higher the reflectivity of the cantilever is, the better the optical sensitivity.

EXAMPLE 3

Figure 4:
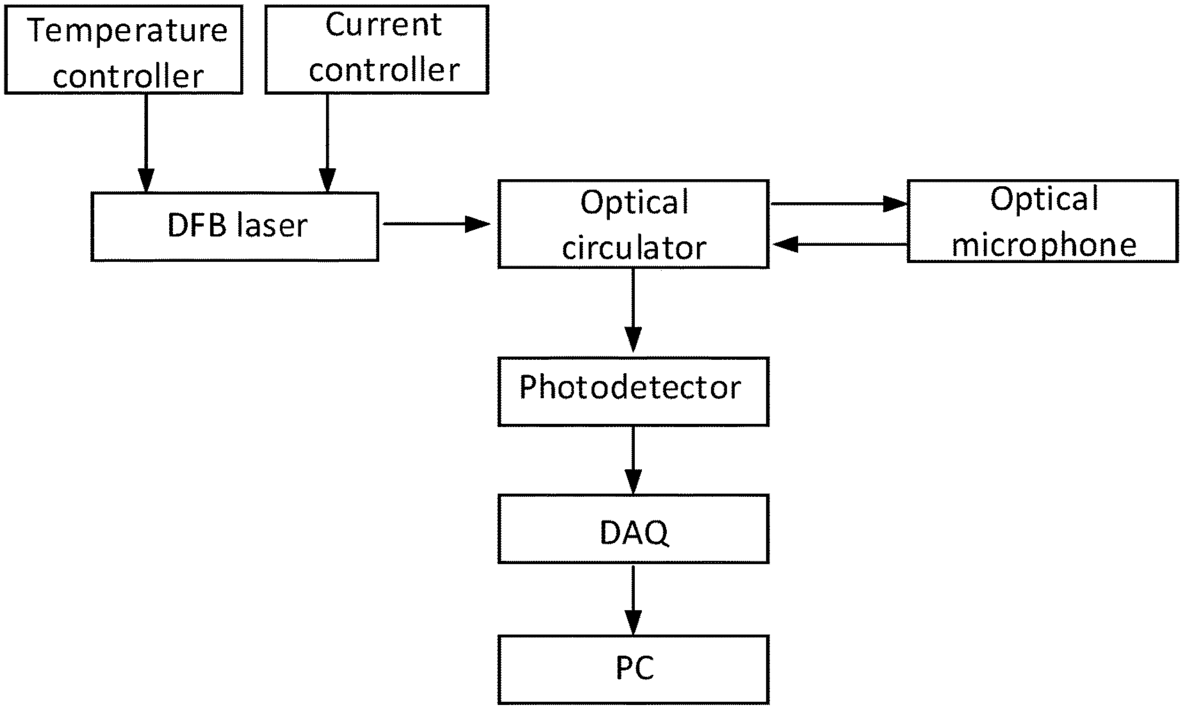
FIG. 4: Structural schematic of the optical acoustic sensing system based on diamond cantilevers in Example 3.
Figure 5:
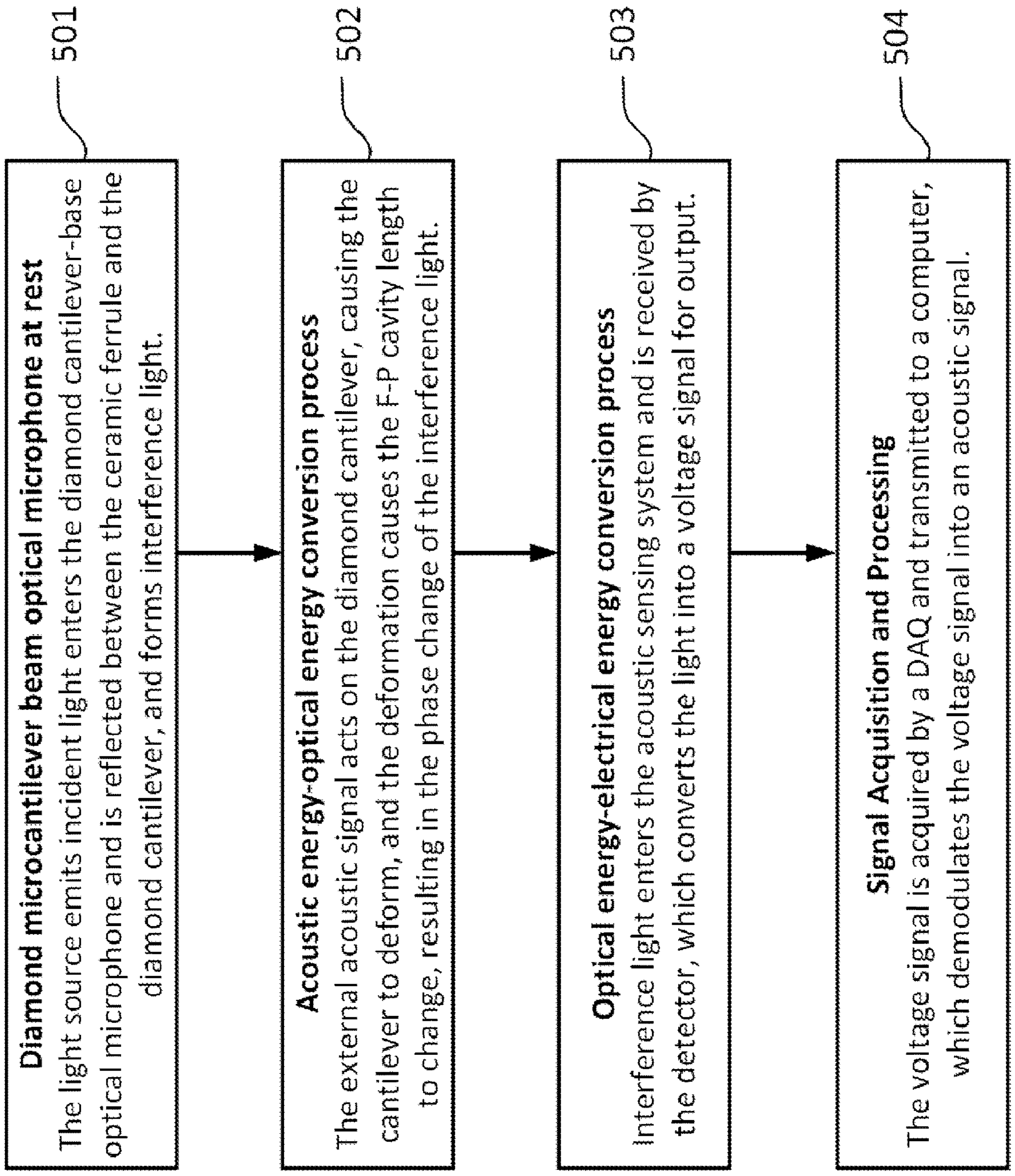
FIG. 5: Workflow diagram of the optical acoustic sensing system based on diamond cantilevers in Example 3.

FIG. 4 shows the structural schematic of the optical sound system based on the diamond cantilever shown in Example 3, while FIG. 5 provides a flowchart of the operating process of the optical sound system.

As shown in FIG. 4, the optical sound system based on the diamond cantilever comprises the following:

An optical microphone based on the diamond cantilever.

A light source component for generating incident light. The light source component includes a light source, temperature controller, and current controller. A temperature controller and current controller are used to control the wavelength of the light source.

An annular device that connects to the light source, directing the incident light provided by the light source into the optical microphone. The annular device is also connected to the optical microphone, directing the reflected light from the optical microphone into a detector.

A detector for receiving the reflected light. The detector is connected to the annular device to receive the imported reflected light. The photodiode inside the detector converts the light signal into a voltage signal for output.

A data processing component for receiving and processing detector signals. The data processing component includes a data acquisition card connected to the detector for collecting the received signals and a computer connected to the data acquisition card for processing the information collected by the data acquisition card.

The sensitivity, Therefore, of the optical sound system is mainly affected by the detector conversion efficiency and is represented by Equation (6):

$$S_o = \frac{\Delta V}{\Delta I_r} = \Re(\lambda) \times G \tag{6}$$

In Equation (6), $\Re(\lambda)$ is the response coefficient of the photodiode in the detector to the wavelength λ, and G is the optical power amplification factor.

As shown in FIG. 5, the optical sound system disclosed in this example relies on the "acoustic-optical-electric" conversion sensing mechanism. The specific sensing process includes the following steps:

Step 501: Diamond Cantilever Optical Microphone at Rest

When there is no external sound field, the diamond cantilever optical microphone is at rest. The light source emits incident light, which, after wavelength adjustment by the temperature controller and current controller, enters the interior of the diamond cantilever optical microphone. Multiple reflections occur between the upper surface of the optical fiber and ceramic core and the diamond cantilever, forming interference light.

Step 502: Acoustic Energy to Optical Energy Conversion Process

When an external sound field acts on the optical transducer, the sound pressure causes deformation (Δx) of the diamond cantilever, converting sound energy into mechanical energy. This deformation causes a change in the F-P cavity length of the optical microphone, with a length change (Δd), resulting in a phase change in the interference light.

Step 503: Optical Energy to Electrical Energy Conversion Process

The interference light enters the optical sound system and is received by the detector, which converts the light intensity into a voltage signal.

Step 504: Signal Collection and Processing Process

The above voltage signal is collected by a digital acquisition card and transmitted to a computer, which demodulates the voltage signal into a sound wave signal.

In the above sensing mechanism, the overall sensitivity Se of the optical microphone disclosed in this embodiment is influenced by the mechanical sensitivity $S_m$ of the diamond cantilever, the interference sensitivity Si of the F-P interference cavity, and the system sensitivity. It is represented by Equation (7):

$$S_e = \frac{\Delta V}{\Delta P} = S_m \times S_i \times S_o = \frac{\Delta d}{\Delta P} \times \frac{\Delta I_r}{\Delta d} \times \frac{\Delta V}{\Delta I_r} \tag{7}$$

EXAMPLE 4

Figure 6:
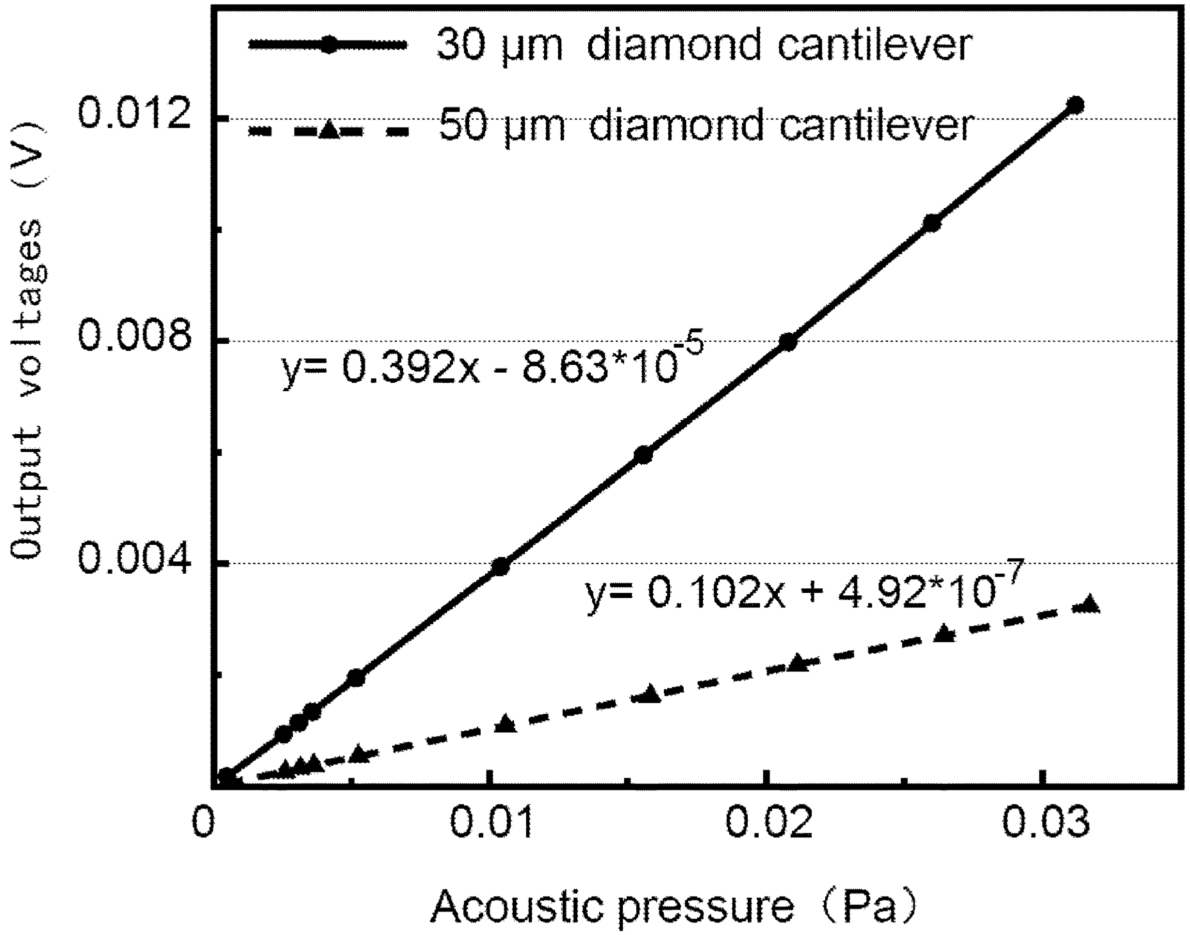
FIG. 6: Output signal graph of the optical microphone based on diamond cantilevers in Example 4.

FIG. 6 shows the output signal graph of the optical microphone based on the diamond cantilever, as shown in Example 4. In this example, tests were conducted by applying a 4.5 kHz sound wave signal to optical microphones with diamond cantilever thicknesses of 30 μm and 50 μm.

As shown in FIG. 6, the output signals of the optical microphones with diamond cantilever thicknesses of 30 μm and 50 μm both exhibit excellent linearity. With increasing sound pressure of the acoustic signal, the output voltage increases. This observation indicates that the diamond microcantilever optical microphone disclosed in this invention possesses efficient energy conversion capabilities.

The fitting curve slope of the optical microphone with a diamond cantilever thickness of 30 μm is greater than that of the transducer with a thickness of 50 μm. This indicates that under the same sound pressure, the thinner the diamond cantilever is, the greater its sensitivity.

In this example, the sensitivity of the optical microphone with a diamond cantilever thickness of 30 μm is 392 mV/Pa, while the sensitivity of the transducer with a thickness of 50 μm is 102 mV/Pa. Both sensitivities surpass those of the commercially available electronic microphone produced by Denmark's B&K company, which has a sensitivity of 50 mV/Pa.

EXAMPLE 5

Figure 7:
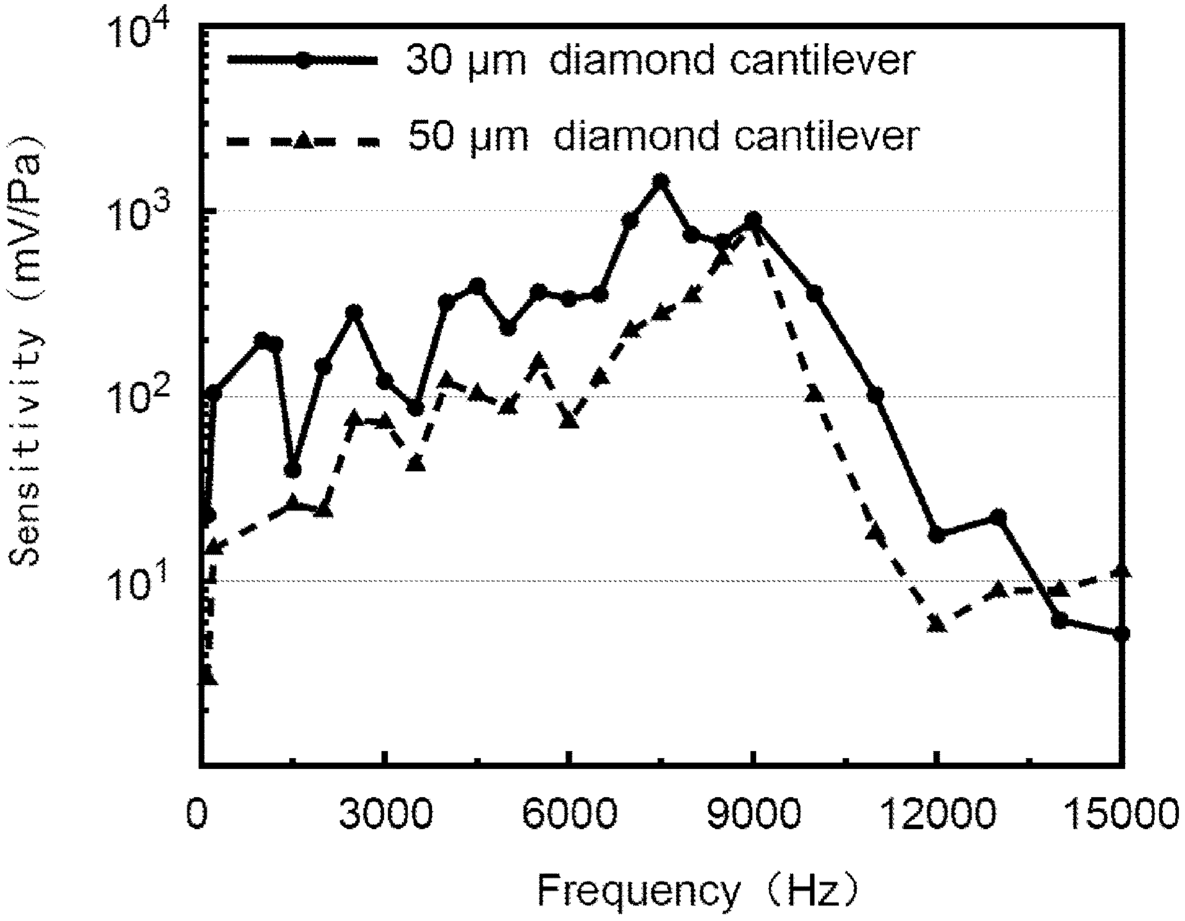
FIG. 7: Frequency response graph of the optical microphone based on diamond cantilevers in Example 5.

FIG. 7 shows the frequency response of the optical microphone based on the diamond cantilever, as shown in Example 5. In this example, sound wave signals ranging from 100 Hz to 15 kHz were applied to optical microphones with diamond cantilever thicknesses of 30 μm and 50 μm. The sensitivity of the optical microphones at different sound wave frequencies was tested and plotted to create frequency response curves.

As shown in FIG. 7, the resonance frequency of the optical microphone with a diamond cantilever thickness of 30 μm is approximately 7.5 kHz, and the flat response range extends from 1 kHz to 7 kHz. This observation indicates that the diamond microcantilever optical microphone disclosed in this invention possesses high sensitivity and a wide frequency response range.

EXAMPLE 6

Figure 8:
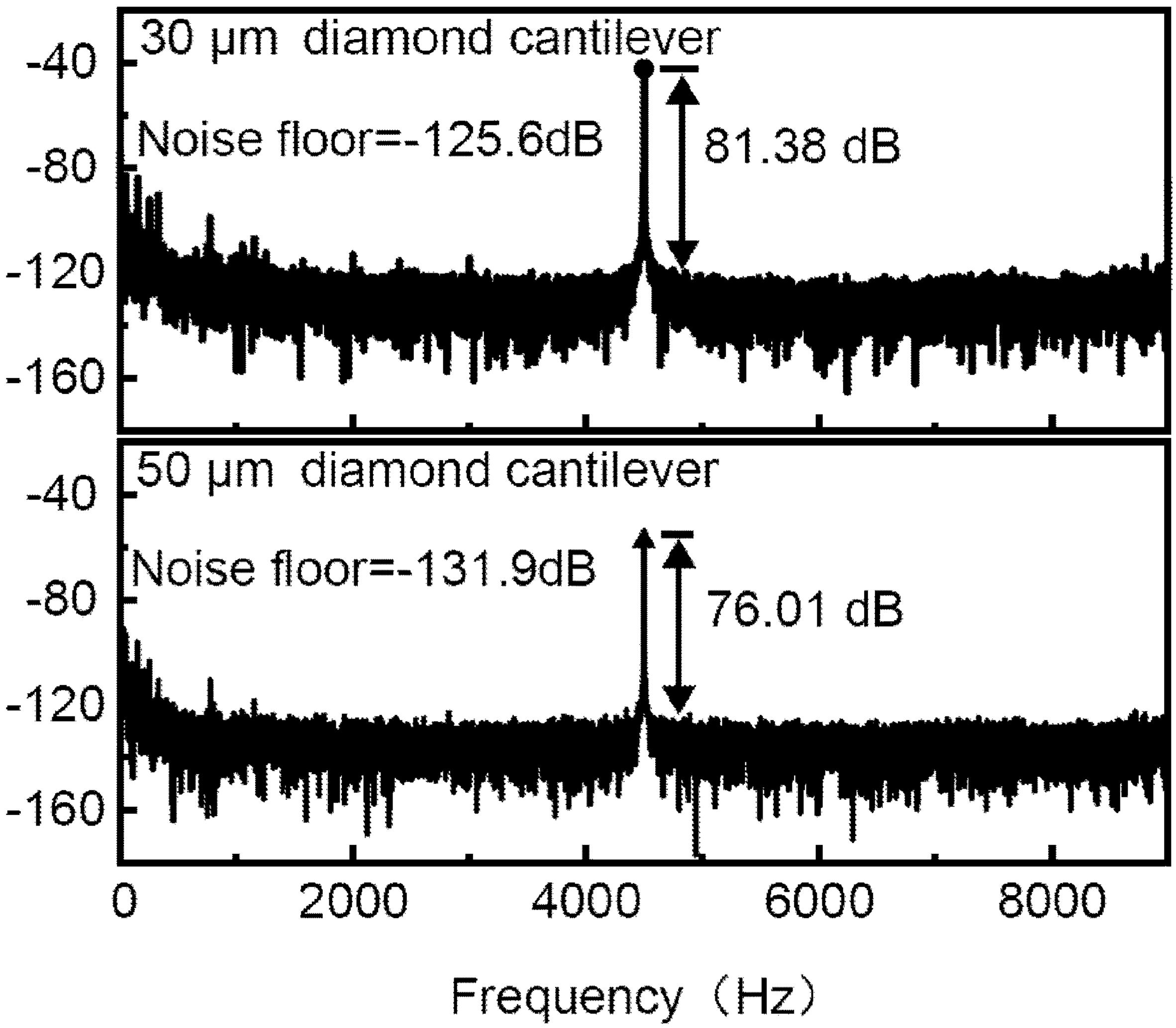
FIG. 8: SNR graph of the optical microphone based on diamond cantilevers in Example 6.

FIG. 8 shows the SNR graph of the optical microphone based on the diamond cantilever, as shown in Example 6. In FIG. 8, the SNRs of optical microphones with diamond cantilever thicknesses of 30 μm and 50 μm are presented under a 4.5 kHz, 30 mPa sound field.

As illustrated in FIG. 8, both optical microphones with diamond cantilever thicknesses of 30 μm and 50 μm exhibit excellent SNRs. Specifically, the SNR of the optical microphone with a diamond cantilever thickness of 30 μm was measured at 81.38 dB.

EXAMPLE 7

Figure 9:
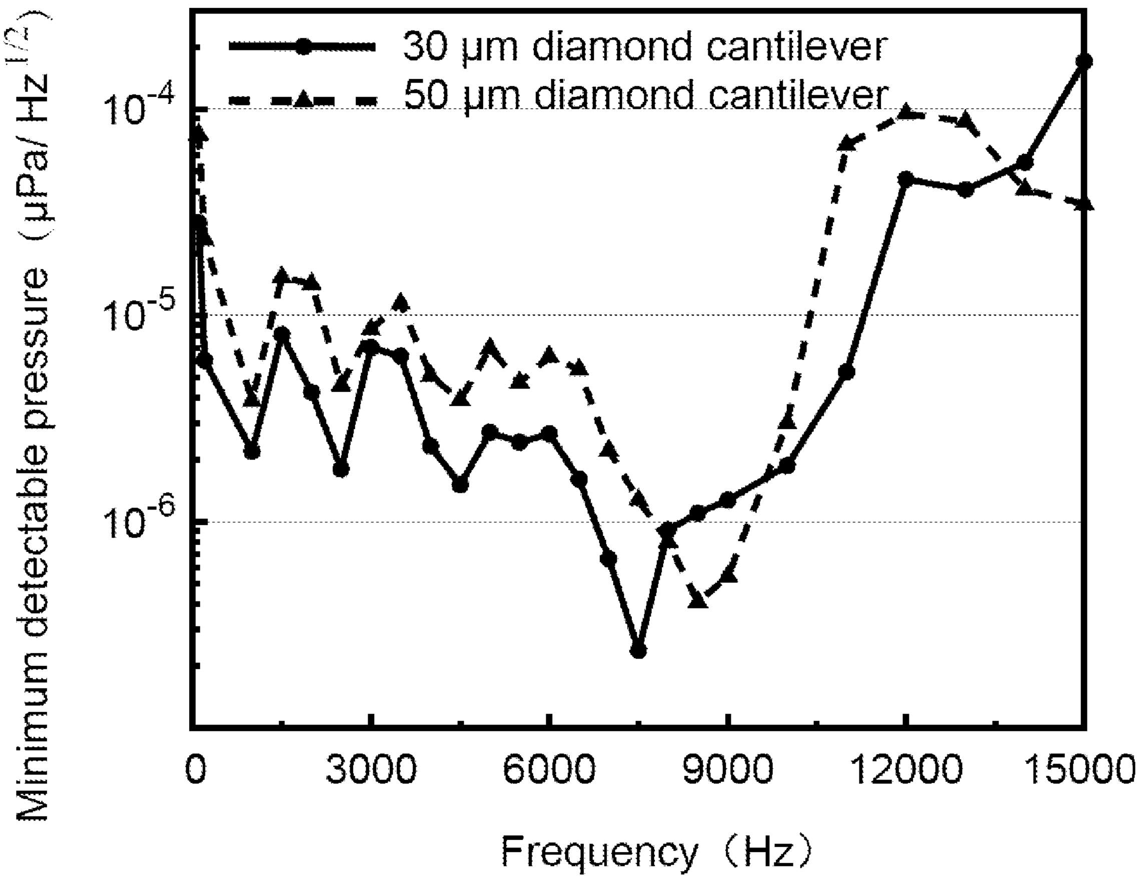
FIG. 9: Minimum detectable sound pressure graph of the optical microphone based on diamond cantilevers in Example 7.

FIG. 9 shows the minimum detectable sound pressure of the optical microphone based on the diamond cantilever, as shown in Example 7. In this example, sound wave signals ranging from 100 Hz to 15 kHz were applied to optical microphones with diamond cantilever thicknesses of 30 μm and 50 μm. The minimum detectable sound pressure of the optical microphone at different sound wave frequencies is plotted.

The minimum detectable sound pressure is defined as the sound pressure detected at a SNR of 1 within the detection bandwidth resolution Δf. As shown in FIG. 9, under a sound pressure of 5 mPa in the frequency range of 100 Hz to 15 kHz with Δf=1 Hz, the minimum detectable sound pressure of the optical microphone with a 30 μm thick diamond cantilever is 0.24 $\mu Pa/\sqrt{Hz}$ This demonstrates that the diamond cantilever optical microphone, as described in the present study, is suitable for detecting extremely weak sound wave signals. Furthermore, the minimum detectable sound pressure of the disclosed diamond cantilever optical microphone surpasses that of electronic commercial microphones produced by Denmark's B&K company, with a minimum detectable sound pressure of approximately 10 $\mu Pa/\sqrt{Hz}$.

An optical microphone based on a diamond cantilever, as described in the present study, comprises a diamond cantilever with outstanding mechanical sensitivity that readily undergoes deformation under acoustic waves. The exceptionally high Young's modulus and low density of diamond confer a high resonant frequency to the diamond cantilever, providing a broad frequency response bandwidth for acoustic devices. Under the same bandwidth requirements, compared to existing metallic materials, diamond allows the fabrication of microcantilever beams thinner, longer in length, and more mechanically sensitive. Moreover, the smooth surface and high optical reflectivity of the diamond cantilever contributed to excellent optical sensitivity. A high quality factor of the diamond cantilever results in low material thermal noise and a high SNR during the energy conversion process. The superior hardness of diamond suppresses sagging caused by gravitational forces, reducing spurious signals in optical interference. An optical sound transducer based on a diamond cantilever, as described in the present study, is suitable for detecting weak acoustic signals and can be used in industrial environments with strong acidity and electromagnetic interference. The proposed optical acoustic sensing system based on a diamond cantilever has a simple structure, low manufacturing cost, high electromagnetic interference resistance, and long detection range, indicating promising applications in the field of acoustic wave detection.

What is claimed is:

1. An optical microphone based on a diamond microcantilever, characterized in that it comprises:

a diamond microcantilever component, wherein the diamond microcantilever component comprises a diamond diaphragm;

a U-shaped groove is provided at a central position of the diamond diaphragm, and a diamond microcantilever is formed by the diamond diaphragm inside the U-shaped groove; and a preparation method of the diamond microcantilever component comprises:

S1—preparing a diamond diaphragm using silicon as a silicon substrate, placed in a chemical vapor deposition device;

adjusting a heating temperature and a pressure of the chemical vapor deposition device, and introducing a certain amount of methane and hydrogen for chemical vapor deposition reaction to obtain a diamond polycrystalline film on the silicon substrate; and separating the diamond polycrystalline film from the silicon substrate to obtain the diamond diaphragm; and S2—preparing a diamond microcantilever covering the obtained diamond diaphragm with a dry etching template with a U-shaped groove;

etching the diamond diaphragm covered with the dry etching template to form a U-shaped groove on the diamond diaphragm, obtaining the diamond microcantilever, and a thickness of the diamond microcantilever is 10-100 μm;

wherein the optical microphone further comprises:

a base, with a first cavity opened at a central position of the base;

a support, positioned above the base to support the diamond diaphragm;

a second cavity is opened at a central position of the support, and the first cavity is connected to the second cavity;

the diamond diaphragm is adaptively positioned on the support, when the diamond microcantilever corresponds to the second cavity;

a pressure plate, positioned above the support, used to fix the diamond diaphragm in cooperation with the support;

a third cavity is opened at a central position of the pressure plate, and the third cavity corresponds to the second cavity;

optical fiber and ceramic insert, adaptively positioned in the first cavity; and an Fabry-Perot (F-P) interference cavity is formed between the optical fiber and ceramic insert and the diamond microcantilever;

and wherein an interference sensitivity Si of the F-P interference cavity is expressed as:

$$S_i = \frac{8\pi\sqrt{\xi R_1 R_2}}{\lambda} I_i \sin\frac{4\pi d}{\lambda}$$

wherein, $R_1$ is a reflectance of the optical fiber and ceramic insert, $R_2$ is the reflectance of the diamond microcantilever, λ is a wavelength of an incident light, ξ is an optical coupling coefficient, $I_i$ is an intensity of the incident light, d is a static cavity length of the F-P interference cavity, wherein the optical coupling coefficient ξ is expressed as:

$$\xi = \frac{4\left[1 + \left(\frac{2\lambda d}{\pi n_0 \omega}\right)^2\right]}{\left[2 + \left(\frac{2\lambda d}{\pi n_0 \omega^2}\right)^2\right]^2}$$

wherein, $n_0$ is a refractive index of air, $n_0=1$, $\omega$ is a mode field radius of the optical fiber and ceramic insert.

2. The optical microphone based on the diamond microcantilever according to claim 1, characterized in that through-holes are set on a side wall of the base, and the through-holes are used to connect the first cavity with the outside of the base.

3. The optical microphone based on the diamond microcantilever according to claim 1, characterized in that diameters of the first cavity, the second cavity, and the third cavity are the same.

4. The optical microphone based on the diamond microcantilever according to claim 1, characterized in that a resonant frequency $\omega_0$ of the diamond microcantilever is expressed as:

$$\omega_0 = \frac{1.875^2}{L^2}\sqrt{\frac{EI}{\rho S(1-\sigma^2)}} = \frac{1.875^2 h}{L^2}\sqrt{\frac{E}{12\rho}}$$

wherein, L is a length of the diamond microcantilever, h is the thickness of the diamond microcantilever, S is a cross-sectional area of the diamond microcantilever, I is a moment of inertia of the diamond microcantilever, E is a Young's modulus of the diamond microcantilever, $\sigma$ represents a Poisson's ratio, and $\rho$ is a density of the diamond microcantilever.

5. The optical microphone based on the diamond microcantilever according to claim 4, characterized in that a mechanical sensitivity $S_m$ of the diamond microcantilever is expressed as:

$$S_m = \frac{3L^2(1-\sigma)}{Eh^2}$$

6. The optical microphone based on the diamond microcantilever according to claim 1, characterized in that when the static cavity length of the F-P interference cavity satisfies $d=(2n+1)\lambda/8$, the interference sensitivity of the F-P interference cavity is maximized, wherein n is a natural number.

7. The optical microphone based on the diamond microcantilever according to claim 1, characterized in that the diamond microcantilever is rectangular.

8. An optical sound transmission system based on a diamond microcantilever, characterized in that it comprises the optical microphone according to claim 1.

* * * * *